United States Patent [19]

Härri

[11] Patent Number: 4,494,062
[45] Date of Patent: Jan. 15, 1985

[54] CIRCUIT ASSEMBLY FOR CHARGING AN ACCUMULATION BATTERY WITH PULSATING DIRECT CURRENT

[75] Inventor: Kurt Härri, Oberkulm, Switzerland

[73] Assignee: Gebrüder Zehnder A.G., Gränichen, Switzerland

[21] Appl. No.: 384,948

[22] Filed: Jun. 4, 1982

[30] Foreign Application Priority Data

Jun. 17, 1981 [CH] Switzerland ............ 3976/81

[51] Int. Cl.³ .................................... H02J 7/04
[52] U.S. Cl. ........................ 320/40; 320/59; 320/DIG. 1; 320/DIG. 2; 323/282
[58] Field of Search ............ 320/30, 39, 40, 43, 320/57, 59, 60, DIG. 1, DIG. 2; 363/86; 323/265, 282

[56] References Cited

U.S. PATENT DOCUMENTS

| | | | |
|---|---|---|---|
| 3,648,189 | 3/1972 | Marchetti | 320/39 |
| 4,162,439 | 7/1979 | Schneider | 320/DIG. 1 |
| 4,198,593 | 4/1980 | Ballman | 320/39 |
| 4,213,080 | 7/1980 | Rock | 320/21 |

FOREIGN PATENT DOCUMENTS

| | | |
|---|---|---|
| 2061294 | 6/1975 | Fed. Rep. of Germany. |
| 1470376 | 4/1977 | United Kingdom. |
| 1569618 | 6/1980 | United Kingdom. |

OTHER PUBLICATIONS

Wireless World, Band 87, Nr. 1544, May 1981 Haywards Heath (GB) G. V. Whitney: "Thyristor Bridge Battery Charger".

Meres & Autom., Hungary, vol. 20, No. 7, 1972.

Primary Examiner—William M. Shoop
Assistant Examiner—Anita M. Ault
Attorney, Agent, or Firm—Oblon, Fisher, Spivak, McClelland & Maier

[57] ABSTRACT

The charging device contains a two-part conductor bar (18′, 18″), the two parts of which can be connected by means of a contact pair (32). When the contact pair is closed, the conductor bar connects a connecting terminal (15) for the accumulator battery (16) to be charged with the primary winding of a firing transformer (37) and with a device (33, 34, 36) for energizing the firing transformer as a function of the voltage of the battery. When the contact pair is opened, the primary winding of the firing transformer and the aforementioned device are separated from the connecting terminal. In addition a control circuit (31) for the contact pair is provided, which receives a first input signal from a timer (26) and a second input signal from a series resistor (12) in the charging circuit. The control circuit contains means which close the contact pair during the period determined by the timer, so that the firing transformer is energized as a function of the voltage of the battery, and open the contact pair after expiry of the predetermined period as soon as the charging current exceeds a presettable value. In this manner it is possible to charge a battery and/or to maintain a limited maintaining charge during a period of any desired length and to interrupt the charging operation when a battery does not reach the set-point of its voltage in the predetermined period.

3 Claims, 3 Drawing Figures

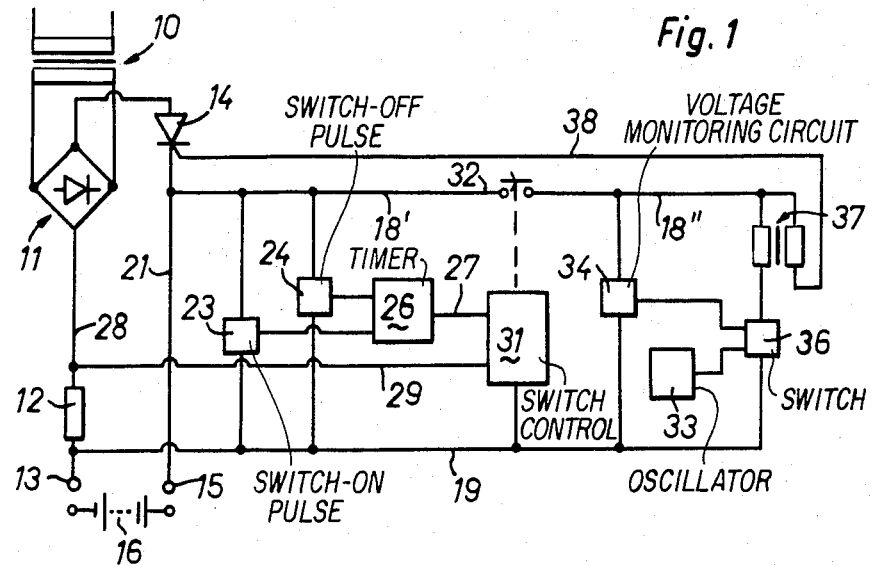

CIRCUIT ASSEMBLY FOR CHARGING AN ACCUMULATION BATTERY WITH PULSATING DIRECT CURRENT

BACKGROUND OF THE INVENTION

1. Field of the Invention

The present invention relates to a circuit assembly for charging an accumulator battery with pulsating direct current, containing at least one controllable current valve disposed between the current source and the connecting terminals for the battery and a series resistor provided for generating a reference voltage proportional to the charging current, and also a device, capable of being connected likewise with the connecting terminals for the battery and controlled by the battery voltage, for generating control pulses for the current valve.

2. Description of the Prior Art

For storing electrical energy, accumulators are preferably used which, when being charged, convert the supplied electrical energy into storable chemical energy and, when being discharged, convert the chemical energy back into electrical energy. The quantity of the energy which can be stored in an accumulator and the level of the voltage that can be obtained are dependent upon the construction and dimensions of the accumulator cells, for which reason a plurality of cells are connected in parallel and/or in series to form an accumulator battery for the storage of large quantities of energy and/or relatively high voltages. Such accumulator batteries can be used as mobile energy sources, for example for lifting and transporting vehicles or for the starting of aircraft engines, and also as stationary energy source, for example in emergency power supply installations or in safety installations against fire, burglary and theft.

The conversion of the electrical energy into chemical energy during charging and also the reverse operation during discharging are accompanied by a material change in the composition bothin the electrode surface and also in the electrolyte, and can lead, in the case of unskilled operation, to irreversible damage. This is true especially when the charging or discharging current exceeds a maximum value, but also if charging is continued when the storage capacity of the cell has already been reached. The water in the electrolyte then decomposes, the gas bubbles evolved at the electrodes destroying the fine-pore electrode surface and the increasing acid concentration of the electrolyte"hardening" the electrodes.

The reduction in the chemically stored energy takes place even when the accumulator supplies no current to an external electrical circuit. Although this process takes place very slowly, accumulators for emergency supplies and safety installations, from which no electrical energy is taken during fairly long periods, must be periodically recharged to assure their operating capability, or, better still, be continuously supplied with a maintaining charge, which compensates the autonomous reduction in the chemically stored energy.

In order to prevent damage to a battery by continued charging, it is known to couple the charging device to a clock which, before charging commences, is set as a function of the charging state and the capacity of the battery and, after the set period has expired, interrupts the charging current. Because it is difficult or indeed impossible accurately to determine the charging state of a battery, it is also improbable that, when a charging time preset on the basis of the charging state has expired, the capacity of a battery will be fully charged and the theoretical voltage achieved. In the majority of cases the preset charging time has expired before the battery is charged, or the battery is charged before the charging time has expired and an after-charging of limited duration takes place. It will be understood also that a time-controlled charging operation is not suitable for a maintaining charge.

In order to avoid this disadvantage, a charging device is known from CH-PS No. 572,288, which controls the duration of the charging current as a function of the battery voltage and also makes possible a maintaining charge. This charging device contains a power supply set comprising a rectifier for pulsating direct current and a controlled valve in the one line between the rectifier and the connecting terminal for the battery to be charged. The connecting terminals are additionally connected with the supply voltage lines of a voltage-dependent oscillator, the output signal of which controls the aforementioned valve. In this manner, when an accumulator battery to be charged is connected, the oscillator is energized and the valve is periodically opened for the charging current, and the oscillation and thus also the charging current are interrupted as soon as the voltage of the accumulator battery exceeds the adjustable maximum operating voltage for the oscillator.

This device is not suitable for charging highly discharged accumulator batteries, because the voltage-dependent oscillator not only shuts off when the operating voltage exceeds a presettable value, but also is not energized when the operating voltage supplied by the accumulator battery does not reach a minimum value.

From CH-PS No. 600,646, an improved charging device is known, which is of similar construction to the above-described device and additionally possesses a threshold value switch, which controls the valve for the charging current so long as the voltage of the accumulator battery is smaller than the voltage necessary for energizing the oscillator.

In particular, the last-named device fulfils all the requirements when only one accumulator cell is to be charged. When an accumulator battery, in which one of several cells is defective and therefore the set-point voltage is not reached, is connected, then the charging operation is not interrupted when the functionally effective cells reach their set-point voltage, which can lead to damage or destruction also of these functionally effective cells.

SUMMARY OF THE INVENTION

The the object of the present invention therefore is to create a circuit assembly for charging an accumulator battery, which enables the charging current to be switched off after a presettable period has expired, the charging current to be interrupted when the voltage of the battery reaches the set-point value before expiry of the set period, and which, after the charging current has been shut off, makes possible a maintaining charge during a period that may be as long as desired.

According to the invention, this task is achieved with a circuit assembly of the initially described type, which is characterized by an electrically actuated switch, disposed in the supply voltage line for the device for generating the control pulses, the energizing circuit of which switch cooperates with a presettable timer and with the series resistor and opens the switch after expiry of the preset charging time with a predetermined time delay, which delay is interrupted and commences again provided that charging current pulses having a settable minimum time interval one from another generate reference voltage signals in the series resistor.

The new circuit assembly enables the charging time of an accumulator battery to be set as a function of the capacity and discharge current. If all the cells of the battery are in good condition and the battery reaches the set-point voltage before or at expiry of the set charging time, then the apparatus supplies, during a period of any length, a maintaining current controlled by the charging voltage, which is of importance especially for emergency power supply installations and safety installations. If one or a plurality of cells of the battery are defective and the latter does not reach the set-point voltage after the preset charging time or if a charging current, which exceeds the likewise presettable maintaining current, continues to flow also after the preset charging time, then the charging current is interrupted. In this way assurance is provided that the cells of the battery to be charged are not overcharged, even if one or several cells are defective, with the result that "boiling" of the electrolyte and a possible loss of acid and also excessive gas evolution and water consumption are prevented and an optimally long operating period of the cells can be achieved.

BRIEF DESCRIPTIONS OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 simplified block diagram of a practically tested form of embodiment of the new circuit assembly, FIG. 2 a simplified circuit diagram of the control circuit for the method of operation of the new assembly and FIG. 3 a simplified circuit diagram of the energizing circuit for the firing transformer.

DESCRIPTION OF THE PREFERRED EMBODIMENT

Figure 3:
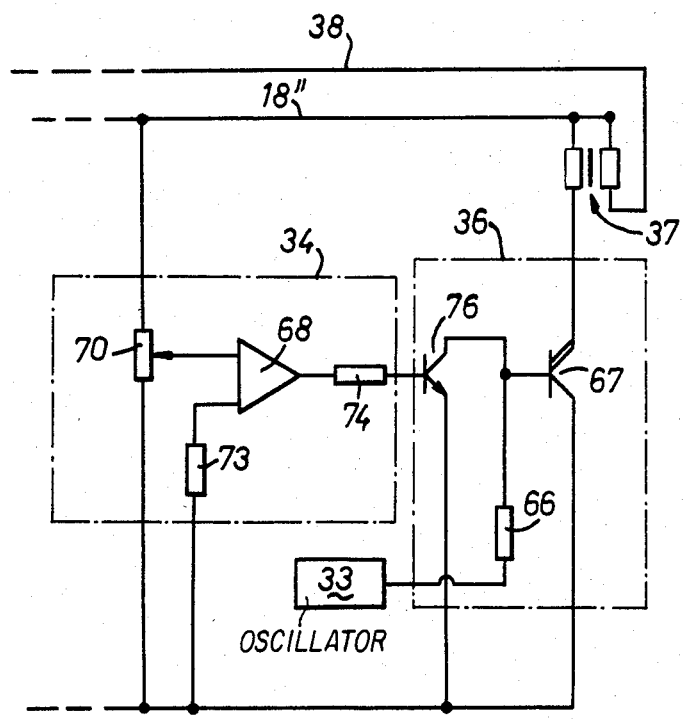

The form of embodiment of the circuit assembly illustrated in block form in FIG. 1 contains an input transformer 10, the primary winding of which can be connected via a main switch, not illustrated, to the supply network. The secondary winding of the transformer is connected with the inputs of a rectifier bridge 11, the one output of which is connected via a series resistor 12 with the one connecting terminal 13 and the other output via a controllable valve 14 with the other connecting terminal 15 for the accumulator battery 16 to be charged. Moreover, the assembly contains an interruptable conductor bar 18', 18" and a continuous conductor bar 19. The interruptable conductor bar is connected with the feed line 21 to the other connecting terminal 15 and the continuous conductor bar is connected with the connecting line 22 between the resistor 12 and the one connecting terminal 13. Between the two conductor bars, a switch-on and switch-off pulse transmitter 23, 24 respectively are connected, the outputs of which are connected with the associated inputs of a timer 26. A first conductor 27 leads from the output of the timer to a switch control circuit 31, and a second conductor 29 leads from the connecting line 28 between the one output of the rectifier bridge and the series resistor to the same control circuit 31. This switch control circuit, to be described in greater detail with reference to FIG. 2, controls a relay, the first contact pair 32 of which is provided for interrupting or connecting the part 18" from or to the part 18' of the interruptable conductor bar. The apparatus also contains a freewheeling oscillator 33 and a voltage monitoring circuit 34, connected between the interruptable conductor bar portion 18" and the conductor bar 19, which control a switch 36. The switch 36 is connected in series with the primary winding of a pulse transformer 37, which series circuit is also connected between the interruptable conductor bar portion 18" and the continuous conductor bar 19. The secondary winding of the pulse transformer is connected via a conductor 38 with the firing electrode of the valve 14.

In FIG. 2, the simplified circuit diagram of the control circuit for the method of operation of the new assembly is shown. The circuit contains a first pnp-transistor 40, the emitter of which is connected with a supply voltage line 41 and the collector via a diode 42 with a capacitor 43, connected to the conductor bar 19. To the base of this first transistor, the output line 27 of the timer 26 is connected. Furthermore, the switch control circuit contains a relay winding 45, which is connected via a protective resistor 46 with the supply voltage line and via an npn-transistor 47 with the conductor bar 19. From the base of this transistor, a first resistor 48 leads to the connecting line between the diode 42 and the capacitor 43 and a second resistor 49 leads to the conductor bar 19.

The control circuit contains additionally an operational amplifier working as voltage comparator 51, the one input of which is connected via a protective resistor 52 with the conductor bar 19 and the other input via a further protective resistor 53 and the conductor 29 to the connecting line 28 between the one output of the rectifier bridge and the series resistor 12. The output of the comparator is connected with the input of a threshold value switch 54, the output of which is applied via a potentiometer circuit 56, 57 to the supply voltage line 41. The tapping of the potentiometer circuit is connected with the base of a pnp-transistor 58, the emitter of which is connected with the supply voltage line 41 and the collector with the tapping of a further potentiometer circuit 59, 60, situated between the supply voltage line 41 and the conductor bar 19. To the same tapping point (and thus also to the collector of the transistor 58), the base of a further pnp-transistor 62 is connected, the emitter of which is connected with the supply voltage line 41 and the collector via a second contact pair 63 and a diode 64 with the capacitor 43 and, via the resistor 48, with the base of the transistor 47.

The first contact pair 32 in the conductor bar 18', 18" and the second contact pair 63 are actuated by the relay winding 45.

The simplified circuit diagram shown in FIG. 3 of the energizing circuit for the firing transformer 37 shows the freewheeling oscillator 33, the output of which is connected via a protective resistor 66 with the base of an npn-transistor 67. The transistor is connected in series with the primary winding of the firing transformer and the series circuit is connected between the interruptable conductor bar 18" and the continuous conductor bar 19. The circuit contains furthermore an operational amplifier 68, provided for monitoring the voltage of the battery connected at the terminals 13, 15, the one input of which amplifier 68 is connected with a potentiometer circuit 70, disposed between the conductor bars 18" and 19, and the other input via a protective resistor 73 with the current bar 19. The output of the operational amplifier is conducted via a resistor to the base of an npn-transistor 76, the collector of which is likewise connected with the base of the transistor 67 and the emitter with the conductor bar 19.

It will be understood that the circuit assembly also contains a part which generates the operational voltage for the individual switching and control circuits. This circuit part, known to every skilled person, and the associated conductors are intentionally omitted from FIGS. 1, 2 and 3, to simplify the illustrations.

So long as no accumulator battery is connected to the terminals 13, 15, no voltage is applied to the conductor bars 18', 19. At the output of the non-activated timer 26, a (+) signal then appears, which blocks the transistor 40. The transistor 47 is then also blocked, and no current flows through the relay winding 45, with the result that the two associated contact pairs 32, 63 are opened. The freewheeling oscillator 65 in the energizing circuit for the firing transformer periodically gates the transistor 67, but no firing pulses can be generated in the firing transformer 37 because the conductor bar 18" does not carry any voltage.

If an accumulator battery 16 is connected to the terminals 13, 15, the battery voltage appears at the conductor bars 18', 19. If the poles of the battery are connected with the connecting terminals in the manner shown in FIG. 1, i.e. the (−) pole to the terminal 13 and the (+) pole to the terminal 15, then the conductor bar 18' is positive relative to the conductor bar 19. The switching-on pulse transmitter 23 then generates a (+) pulse, which activates the timer 26. During the preset charging time, a (−) signal then appears at the output of the timer, which signal switches the transistor 40 into the conducting state. The current through the transistor charges the capacitor 43, so that the transistor 47 also is switched into the conducting state and an energizing current flows through the relay winding 45, which closes the two contact pairs 32, 63.

After closure of the contact pair 32, the conductor bar part 18" is also energized, so that at each gating of the transistor 67 a current surge flows through the primary winding of the firing transformer 37, inducing a firing pulse in the secondary winding. The sequence of firing pulses is conducted via the line 38 to the firing electrode of the valve 14, which then closes the charging current circuit from the rectifier bridge 11 via the valve 14, the accumulator battery 16 to be charged and the series resistor 12.

The charging current produces voltage drop across the series resistor 12, which appears as voltage difference at the inputs of the voltage comparator 51. The voltage difference produces at the output of the comparator a (+) signal and at the output of the succeeding threshold value switch 54 a (−) signal. This (−) signal switches the transistor 58 into the conducting state, and this transistor then blocks the transistor 62. In this manner, no charging current can flow through the transistor 62 and the closed contact pair 63 to the capacitor 43 so long as the output signal of the timer 27 switches the transistor 40 into the conducting state.

The operational amplifier 68 used for monitoring the battery voltage is so set by means of the potentiometer circuit 70 that a (−) signal appears at its output so long as the voltage between the conductor bars 18", 19 is smaller than the set-point of the voltage of the charged accumulator battery. The (−) output signal blocks the transistor 76, which thereupon does not influence the transistor 67.

As soon as the voltage of the accumulator battery reaches the set-point, a (+) signal appears at the output of the operational amplifier 68, which signal switches the transistor 76 into the conducting state and thereby blocks the transistor 67. No firing pulses are then any longer generated, the valve 14 remains blocked and the charging current for the battery is interrupted.

At the same time, the switching-off pulse transmitter 24 generates an output pulse which resets and de-activates the timer 26. A (+) signal then appears at the output of the timer, which signal blocks the transistor 40 and interrupts the charging current for the capacitor 43. The interrupting of the battery charging current has the consequence that an equal voltage is present at the two ends of the series resistor 12 and thus also at the inputs of the comparator 51, and a (−) signal appears at the output of the comparator. A (+) signal then appears at the output of the threshold value switch 54, and the transistor 58 is blocked. As soon as the transistor 58 is blocked, the transistor 62 is switched into the conducting state and charges the capacitor 43. In this way it becomes possible that, even after the set-point of the battery voltage has been reached, the transistor 47 remains in the conducting state and the relay winding 45 remains energized and the contact pair 32 in the conductor bar 18', 18" (and naturally also contact pair 63) remain closed.

If, after the intended set-point voltage has been reached, the accumulator battery is not separated from the terminals 13, 15, then the circuit assembly remains ready for operation. If the battery voltage then falls below the set-point voltage due to the initially mentioned autonomous reduction of the chemically stored energy, there then again appears at the output of the operational amplifier 68 which monitors the voltage a (−) signal, which blocks the transistor 76. The base of the transistor 67 is then separated from the conductor bar 19 and the transistor can again be gated in the cycle of the output signals from the oscillator 65. The charging current which then becomes established produces, as already described, a voltage difference across the series resistor 12 and at the inputs to the comparator 51, which has the result that the transistor 62 is blocked and the charging current for the capacitor 43 is interrupted.

The capacitance of the capacitor 43 and the resistance of the series resistors 48, 49 are so designed that the period for charging the capacitor is greater than the period for recharging the accumulator battery in maintaining charge operation, i.e. the battery reaches its set-point voltage and the operational amplifier 68 interrupts the production of firing pulses and thus the charging current, before the capacitor 43 is discharged. With the interruption of the battery charging current, the voltage difference at the inputs of the comparator 51 again becomes zero, the transistor 62 is again switched into the conducting state and the capacitor 43 is again charged.

If the set-point voltage is not reached in the intended recharging period and the capacitor 43 becomes discharged before the set-point voltage is reached then the transistor 47 is blocked, the current through the relay winding 45 is interrupted, and the two contact pairs 32 and 63 are opened. Thereafter neither a continuing charging, nor a maintaining charging of the battery is possible.

As has been described above, the new circuit assembly permits the charging of an accumulator battery to the set-point voltage and supplies a maintaining charge until the battery is disconnected. If the battery is erroneously connected with the wrong polarization, no switching-on pulse is generated and therefore any damage to the battery and to the assembly is prevented. If a cell of the battery is damaged and the battery does not reach the set-point voltage during the preset charging time, then the charging current which continues to flow after expiry of the preset charging time interrupts the charging operation, with the result that overcharging of the operationally effective cells and the associated gas formation and loss of water are avoided. The charging operation is also interrupted if the battery voltage rises, for example due to external heating up of the cells, and the voltage rises above the set-point value before the battery is charged.

The described circuit assembly can be modified in numerous ways and adapted to special operating conditions. For example, instead of the single-phase rectifier bridge illustrated, a three-phase bridge may also be used comprising six valves and an appropriately constructed firing transformer. The timing element may comprise a manually operated change-over switch, which enables the presettable charging time to be set as a function of the nominal values of the accumulator battery to be charged. The delay circuit composed of the capacitor and the two series resistors for the interruption of the energizing current of the relay winding can be dimensioned according to values obtained from experience for the maintaining current. Discharge times tested in practice for the capacitor lie in the range between one and five seconds. The operational amplifier used for monitoring the battery voltage especially during the maintaining charge operation reached measurement accuracies in the range of one hundreth of a volt. The oscillator is preferably a square-wave generator, the frequency of which is substantially higher than the frequency of the charging current and, for example, is 800 Hz. In this manner a synchronization of the oscillator with the frequency of the charging current is not necessary and the small displacements of the firing angle at the valve resulting from the non-synchronization are negligible. Instead of the operational amplifier used for the voltage monitoring and of the oscillator oscillating with constant frequency, a voltage-dependent oscillator of the type mentioned in the introduction may also be used. This may be especially advantageous when the circuit assembly is used at very low ambient temperatures and the operating conditions of the assembly need to be adapted to the highly temperature-dependent voltage of the accumulator battery to be charged. It will be understood also that the device for generating the switching-off pulse for the timing element and the voltage measuring device which controls the firing transformer can be set to the set-point voltage of the accumulator battery to be charged.

The electronic components used for the construction of the new circuit assembly are commercially obtainable and their optimum selection lies within the scope of the specialist skilled person, for which reason information in this respect is expressly omitted here.

I claim:

1. A device for charging an accumulator type battery comprising:

a current source for providing a charging current;
   terminal means for connecting said device to said battery;
   a controllable current valve means connected between said current source and said battery for controlling said charging current to said battery;
   a series resistor connected to said current source for providing a reference voltage proportional to said charging current;
   a control pulse generating means connected to said terminal means and said controllable current valve means for generating control pulses to said controllable valve means in relationship to the voltage of said battery;
   electrically actuated switch means connected to said control pulse generating means for electrically connecting and disconnecting said control pulse generating means and said controllable current valve means; and
   energizing means connected to said electrically actuated switch means including presettable timer means for supplying a deenergizing signal to said electrically actuated switch at a preset time after a predetermined delay, said delay resets upon said charging current generating a predetermined reference voltage in said series resistor.

2. A device according to claim 1, wherein said presettable timer is an electronic component, one input of which is connected with a circuit which generates a switching-on pulse when said battery is connected and the other input of which is connected with a circuit which generates a switching-off pulse when the voltage of the battery exceeds a preset value.

3. A Device according to claim 1 wherein said control pulse generating means comprises at least one oscillator the output signal of said oscillator controls a transistor situated in the primary circuit of a firing pulse transformer, and a circuit which blocks said transistor when the voltage of said battery exceeds a predetermined value.

* * * * *